(12) United States Patent
Yamaguchi

(10) Patent No.: US 7,859,697 B2
(45) Date of Patent: Dec. 28, 2010

(54) IMAGE TRANSMISSION APPARATUS

(75) Inventor: Yasuhiko Yamaguchi, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1097 days.

(21) Appl. No.: 11/586,067

(22) Filed: Oct. 24, 2006

(65) Prior Publication Data
US 2007/0177194 A1 Aug. 2, 2007

(30) Foreign Application Priority Data
Jan. 31, 2006 (JP) .............................. 2006-022856

(51) Int. Cl.
*G06F 15/00* (2006.01)
*G03G 15/00* (2006.01)

(52) U.S. Cl. .......................................... 358/1.15; 399/8

(58) Field of Classification Search ................. 358/1.1, 358/1.9, 1.13, 1.14, 1.15, 1.16, 1.18, 3.24, 358/3.28, 426.01, 474, 505, 518; 382/100, 382/239; 399/8, 21, 81, 391, 411; 400/62; 715/700
See application file for complete search history.

(56) References Cited

U.S. PATENT DOCUMENTS
2001/0052991 A1* 12/2001 Oomori ....................... 358/1.9
2006/0017965 A1* 1/2006 Tonegawa ................... 358/1.15

FOREIGN PATENT DOCUMENTS

| JP | 2000-232549 A | 8/2000 |
| JP | 2002-247388 A | 8/2002 |
| JP | 2003-152945 A | 5/2003 |
| JP | 2003-134280 A | 9/2003 |
| JP | 2006-005635 A | 1/2006 |
| JP | 2006-014362 A | 1/2006 |

OTHER PUBLICATIONS

Japanese Office Action (and English translation thereof) dated Feb. 28, 2008, issued in a counterpart Japanese Application.

* cited by examiner

*Primary Examiner*—Saeid Ebrahimi Dehkordy
(74) *Attorney, Agent, or Firm*—Holtz, Holtz, Goodman & Chick, PC

(57) ABSTRACT

An image transmission apparatus for transmitting image data to a designated destination including, a mode selection section for receiving a transmission mode selection, and a destination selection section for receiving a destination selection, wherein the destination selection section enables to select a destination according to the transmission mode selected by the mode selection section.

18 Claims, 12 Drawing Sheets

IMAGE TRANSMISSION APPARATUS

CROSS REFERENCE TO RELATED APPLICATION

The present application is based on Japanese Patent Application No. 2006-022856 filed with Japan Patent Office on Jan. 31, 2006, the entire content of which is hereby incorporated by reference.

BACKGROUND OF THE INVENTION

1. Field of the Invention

The present invention relates to an image transmission apparatus such as a facsimile apparatus for sending image data to a designated destination.

2. Description of the Related Art

In recent years, in a facsimile apparatus, in addition to the G3 method of a communication method utilizing public telephone line, a network facsimile apparatus such as an IP (Internet Protocol)-facsimile apparatus for transmitting and receiving image data via Internet has become popular. In the network facsimile apparatus, since large quantity of image data can be transmitted through the network in a high speed with low cost, there is an apparatus, which is capable of transmitting and receiving color images.

Due to the appearance of such a color facsimile apparatus, a situation where monochrome facsimile apparatuses and color facsimile apparatuses exist together has appeared. Thus, when using a broadcast function, which is a function for transmitting the same image data to a plurality of destinations with one operation, the possibility that a color facsimile apparatus and a monochrome facsimile apparatus coexist in broadcast destinations occurs.

Japanese Patent Application Open to Public Inspection No. 2003-134280 discloses a facsimile apparatus for reading a document in color and converting the read document into color or monochrome data corresponding to the capability of the facsimile apparatus of the destination when a color facsimile apparatus and a monochrome machine coexist in the broadcast destinations.

In order to convert the read document into a color or a monochrome data corresponding to the capability of the facsimile apparatus in each destination, hardware for executing the conversion is needed and a cost-and-technical burden becomes large. Further, since the document is read in color, there is a possibility that a user (an operator) of the facsimile apparatus thinks that a color image data is transmitted to all destinations.

On the other hand, it is also difficult and inconvenient for the user or the operator of the facsimile apparatus to designate the destination without an error based on the user's recognition of the color or monochrome facsimile apparatus for each destination so that a color facsimile apparatus and a monochrome facsimile apparatus are not mixed up. The same problem occurs not only in the error associated with the color/monochrome facsimile apparatus recognition, but also in various transmission modes, which relate to the receiving capability of the facsimile apparatus of the destination.

It is therefore an object of the present invention is to provide an image transmission apparatus, which is capable of easily designating only destinations having capability of corresponding to the transmission mode, which a transmitter selects, without an error. It is also another object of the present invention is to provide an image transmission apparatus, which is capable of easily designating only a transmission mode, to which a destination which a transmitting side selects can correspond, without an error.

SUMMARY

An apparatus reflecting one aspect of the invention to achieve the above-described object is an image transmission apparatus, which transmits image data to a designated destination, the image transmission apparatus including a mode selection section for receiving a transmission mode selection and a destination selection section for receiving a a destination selection, wherein the destination selection section enables the image transmission apparatus to select a destination corresponding to the transmission mode, which is selected by the mode selection section.

An apparatus reflecting another aspects of the invention is an image transmission apparatus for transmitting an image data to a designated destination, the image transmission apparatus including a mode selection section for receiving a selection of a transmission mode and a destination selection section for receiving a destination selection, wherein the mode selection section enables the image transmission apparatus to select an transmission mode corresponding to a selected destination selected by the destination selection section.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENTS

An embodiment of the present invention will be described by using the drawings below.

Figure 1:
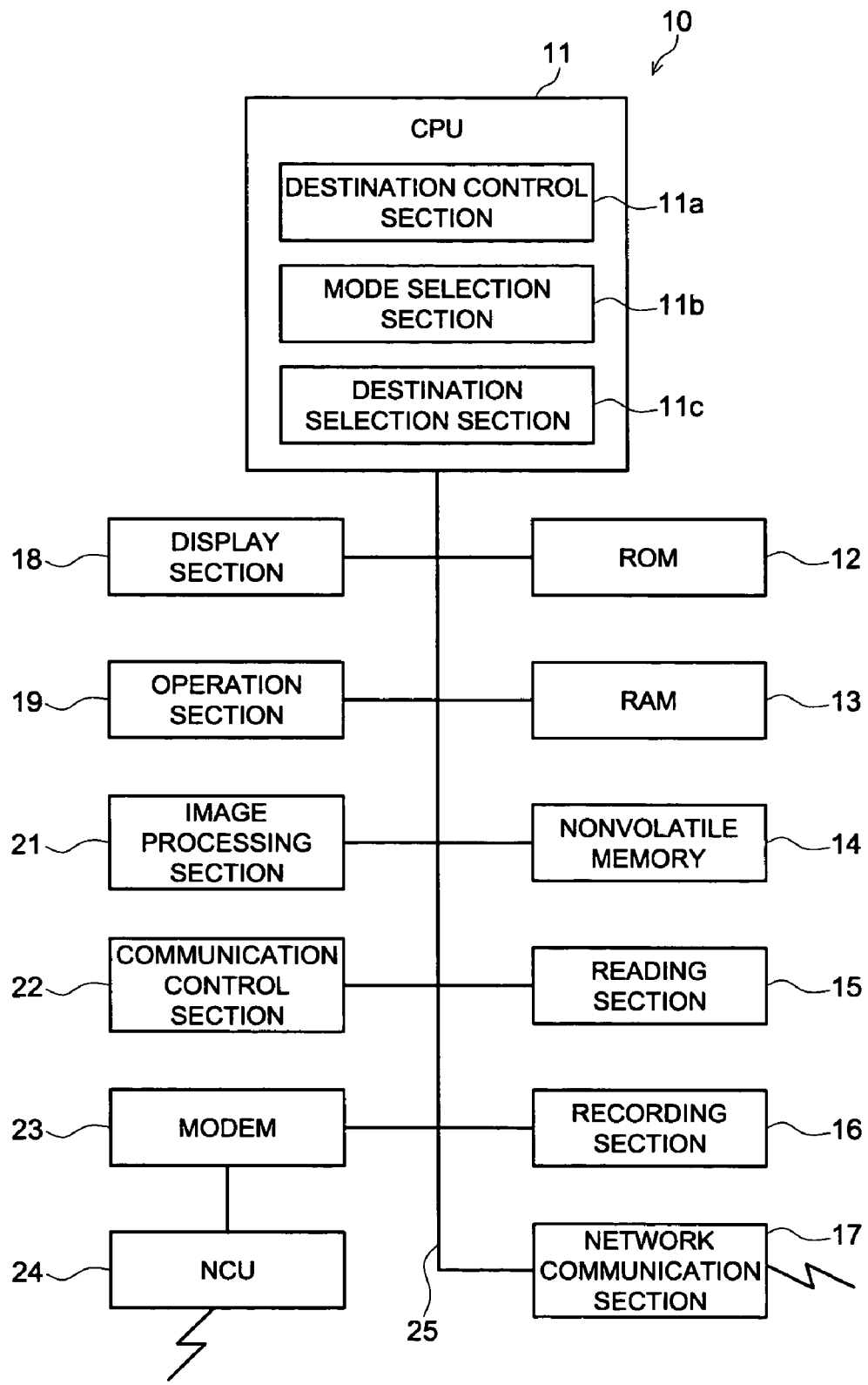
FIG. 1 illustrates a block diagram showing a configuration of a MFP (Multi Function Peripheral) of the embodiment of the present invention.

FIG. 1 illustrates the block diagram showing the configuration of a MFP (Multi Function Peripheral) 10 as an image transmission apparatus of the embodiment of the present invention. The MFP 10 comprises, other than the copy function for reading a document image and forming a copy of the image on a recording paper sheet, a print function for printing the image based on the print data received from an external terminal, a scanning function for reading the document image and storing the image data corresponding to the document image and outputting them to the external apparatus, and a facsimile function for transmitting and receiving the image data via communication network. The MFP 10 is configured as a color apparatus capable of reading the image in color, conducting a color print and transmitting and receiving a color image data.

The MFP 10 comprises a CPU (Central Processing Unit) 11, a ROM (Read Only Memory) 12, a RAM (Random Access Memory) 13, a nonvolatile memory 14, a reading section 15, a recording section 16, a network communication section 17, a display section 18, an operation section 19, an image processing section 21, a communication control section 22 and a modem 23, which are connected to bus 25. A NCU (Network Control Unit) 24 is connected with the modem 23.

A CPU 11 plays a role of functions for totally controlling the operation of the MFP 10. The ROM 12 is a read only memory storing various programs, which have been pre-stored therein. The RAM 13 is used as a work memory for temporarily storing various data when executing the program stored in the ROM 12 and as an image memory for memorizing image data. The nonvolatile memory 14 is a memory for memorizing system settings and destination information, which a user has registered, in a nonvolatile state.

The reading section 15 plays a role for optically reading a document image in color and outputting the corresponding image data. The reading section 15 comprises a color line image sensor.

The recording section 16 plays a role for forming a color image corresponding to the image data on a recording paper sheet. Here, the recording section 16 is configured as a color laser printer using an electro photographic process, the color laser printer having a conveyance apparatus for conveying the recording paper sheet, a photosensitive drum, a charging apparatus, a laser unit, a developing apparatus, a transfer-separation apparatus, a cleaning apparatus and a fixing apparatus.

The display section 18 is configured by a liquid crystal display, which displays a setting screen and various screens for user interface such as an operation screen. The operation section 19 is configured with a touch panel provided on the screen of the liquid crystal display and operation switches, which plays a role for receiving various user operations.

The CPU 11 plays a role as a destination control section 11a for memorizing the registered contents of the nonvolatile memory 14 when receiving a registered destination, a mode selection section 11b for receiving the selection of a transmission mode and a destination selection section 11c for receiving the destination selection operation based on the program stored in the ROM 12. These setting and operations are received through the display section 18 and the operation section 19. Further, these setting and operations are also received from an external terminal such as a personal computer through the network communication section 17. With regard to the transmission mode, there are a color mode for transmitting the image in color and a monochrome mode for transmitting the image in monochrome.

The image processing section 21 plays a role for applying various processes to the image data such as magnification, reduction, rotation, compression and expansion.

The network communication section 17 plays a role for transmitting and receiving data to or from an external apparatus through network such as LAN (Local Area network). The NCU 24 is a control circuit for connecting the MFP 10 to public telephone line PSTN (Public Switched Telephone Network). The modem 23 is a modulator/demodulator for transmitting and receiving digital data through the analog public telephone line.

The communication control section 22 fills a role of a control function for conducting facsimile communication with an external apparatus by using the network communication section 17, the modem 23 and the NCU 24. In this embodiment, the communication control section 22 are arranged to correspond three types of communication methods such as Internet facsimile (direct SMTP), SIP (Session Initiation Protocol)-facsimile and G3-facsimile.

The Internet facsimile (direct SMTP) conducts facsimile communication by using a protocol of Recommendation T.37 of ITU-T (International Telecommunication Union-Telecommunication sector). In the T.37, the image data is sent as an attached file of an electronic mail. The electronic mail to which the image file is attached is transmitted or received through a mail server. Further, there is a facsimile communication system for transmitting and/or receiving image data by directly connecting with the party's apparatus without the mail server.

The G3-facsimile is a facsimile communication method based on the Recommendation T.30 of ITU-T. The public telephone line is used for the communication.

SIP-facsimile is a facsimile communication method for directly transmitting and/or receiving image data between a transmitter and a receiver with peer to peer through the Internet. In the SIP-facsimile, a server is set on the network, the server being called a SIP server to which identification information (for example, a telephone number of facsimile on the public telephone line) for identify the facsimile apparatus and an IP destination are registered. A transmitter sends a connection request to the SIP server with a facsimile number of the party. Then the SIP server retrieves the IP destination of the party from the received facsimile number. Then the SIP server connects the transmitter with a receiving apparatus. The SIP server is a server for conducting a calling control. The transmitting method for the image data after the connection will be separately set. For example, a protocol based on the Recommendation T.38 of ITU-T is used.

The transmission and reception of the color images is available in both the Internet facsimile (Direct SMTP) and the SIP-facsimile. However, the color transmission and receiving is not available in the G3-facsimile. The monochrome transmission and receiving is available in any one of Internet facsimile (Direct SMTP), SIP-facsimile and G3-facsimile.

Firstly, the destination registration in the MFP 10 will be described. In the destination registration, there are three types of registration such as an abbreviated destination registration, a group destination registration and a program destination registration. In the abbreviated destination registration, one destination is assigned to each abbreviated number (a registration number). In the group destination registration, a plurality of abbreviated destinations is registered as a group. The registered abbreviated destination is used for the broadcast transmission. The program destination registration can register an arbitrary transmission condition other than the destination. Further, the program destination registration can register a plurality of abbreviated destinations as a destination.

Figure 2:
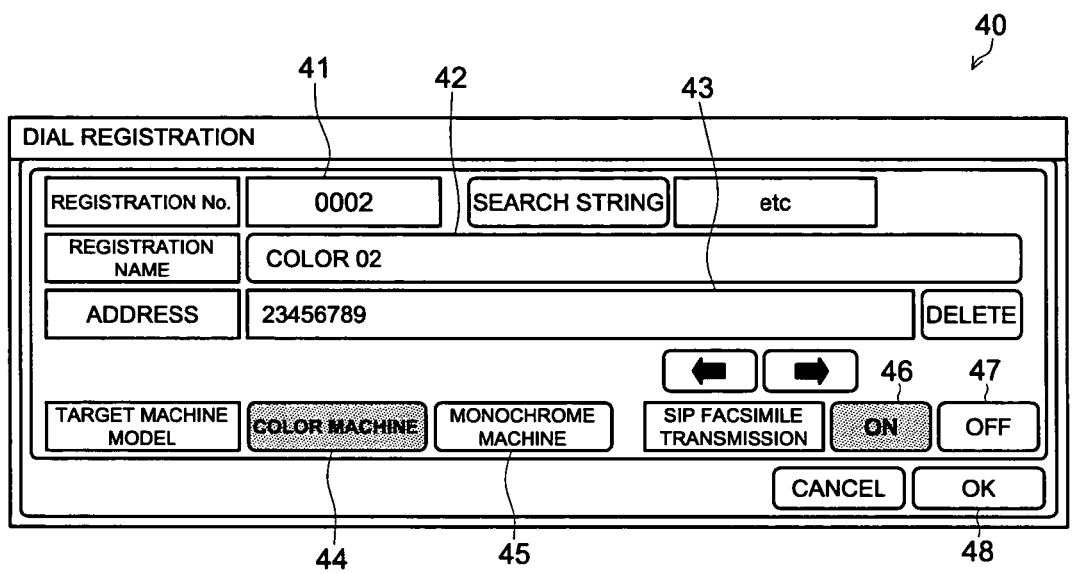
FIG. 2 illustrates a front view showing an example of a screen used for registering an abbreviated destination displayed on the display section of the MFP of the embodiment of the present invention.

FIG. 2 illustrates an example of an abbreviated destination registration screen 40 displayed in the display section 18. In the registered number column 41 of the abbreviated destination registration screen 40, an abbreviated number under registration is displayed. In the registration name column 42, the name of the destination to be registered corresponding to the abbreviated destination displayed in the registered number column 41 is displayed. In the destination column 43, the telephone number (facsimile number) of the public telephone line is registered. The display contents of the registration name column 42 and the destination column 43 are inputted and changed by the operation section 19 or the keyboard screen displayed on the display section 18.

A color machine button 44 is a button for registering that a target machine (the receiving machine of the destination) is a color machine. A monochrome machine button 45 is a button for registering the target machine is a monochrome machine. The color machine button 44 or the monochrome machine button 45 is alternatively selected, and the selected button is displayed in different color characters and different color background so that the user (operator) can identify the difference from the non-selected button. In the example illustrated in FIG. 2, the selected button is illustrated with halftone dots.

As described above, when registering the destination, the receiving capability information, (in the present embodiment, the information specifying a color machine or a monochrome machine), can be registered, which specifies the receiving capability to correspond the request in correlation with the destination.

An ON button 46 of the SIP facsimile transmission is an operation button for setting the ON operation of the transmission of the SIP-facsimile transmission. An OFF button 47 of the SIP-facsimile transmission is an operation button for setting the OFF operation of the transmission of the SIP-facsimile transmission. The ON button 46 or the OFF button 47 of the SIP-facsimile transmission is alternatively selected and the selected button is displayed in different color characters and different color background so that the user (operator) can identify the difference from the non-selected button. When operating an OK button 48, the contents being displayed in the abbreviated destination registration screen 40 is registered in the nonvolatile memory 14 corresponding to the abbreviated number displayed in the registered number column 41.

As described above, when registering the destination, the transmission mode information (in this embodiment, information designating SIP facsimile transmission ON or SIP facsimile transmission OFF) can be registered corresponding to the destination.

Figure 3:
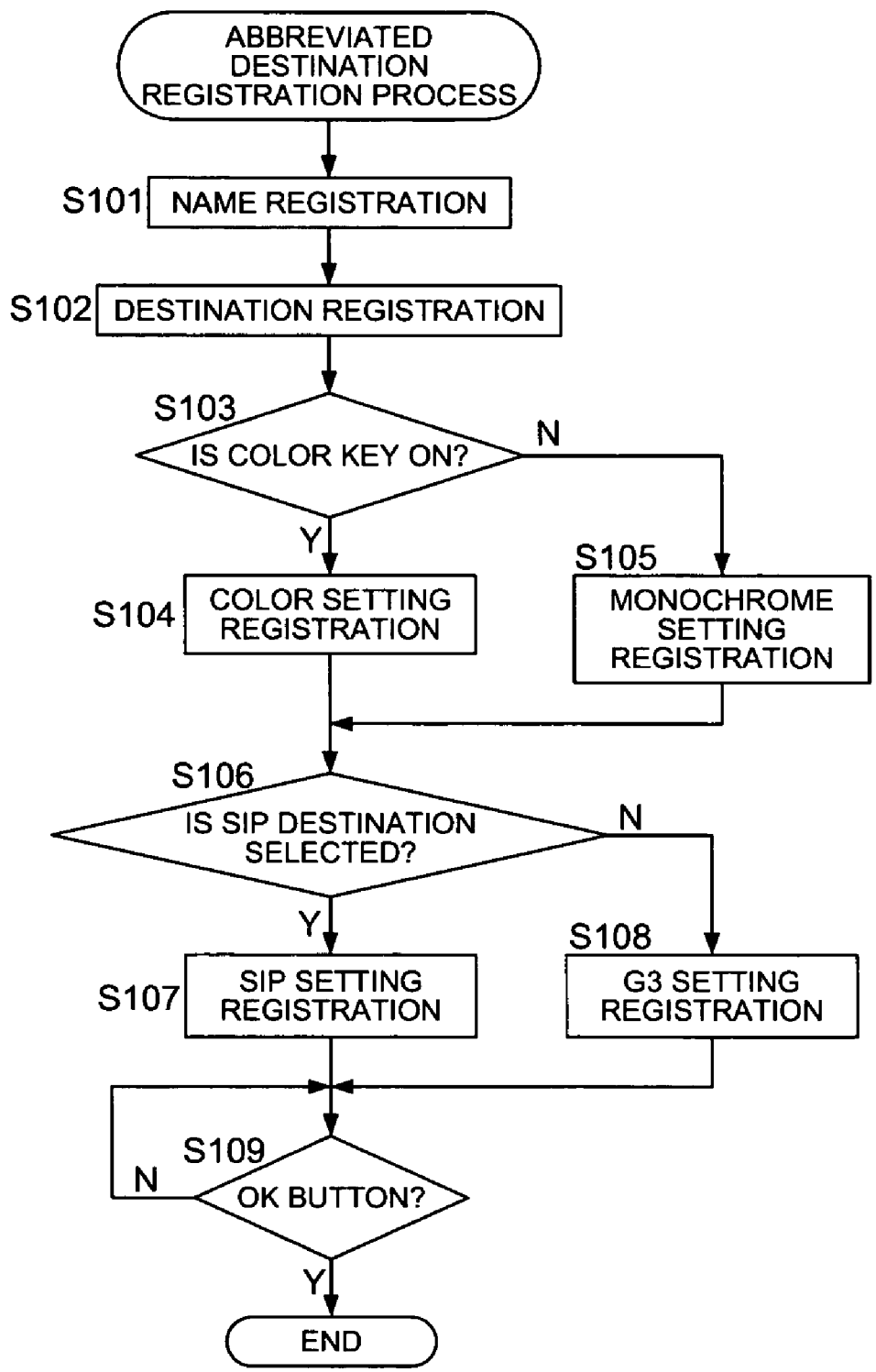
FIG. 3 illustrates a flowchart showing the registration process of the abbreviated destination in the MFP of the embodiment of the present invention.

FIG. 3 illustrates a flowchart showing the registration process of the abbreviated destination. In a step S101, the name of the destination is inputted in the registration name column 42. In a step S102, a destination such as a facsimile number is inputted in the destination column 43. Further, when the color machine button 44 has been selected (a step S103; Y), it inputs that the target machine is a color machine (a step S104). When the monochrome machine button 45 has been selected (a step S103; N), it inputs that the target machine is a monochrome machine (a step S105). As described above, the destination registered as the color machine with regard to the receiving capability information, can receive color images and monochrome images. On the other hand, the destination registered as the monochrome machine with regard to the receiving capability information, can receive only monochrome images.

When the ON button 46 of the SIP facsimile transmission has been selected (a step S106; Y), and if the OK button 48 is pressed (a step S109; Y) after designating the SIP-facsimile as the destination, namely after inputting that the transmission is conducted under the SIP-facsimile communication method (a step S107), the process finishes (END). On the other hand, when the OFF button 47 of the SIP facsimile transmission has been selected (a step S106; N), and if the OK button 48 is pressed (a step S109; Y) after designating the G3-facsimile as the destination, namely after inputting that the transmission is conducted under the G3-facsimile communication method (a step S108), the process finishes (END).

In the registration of the abbreviated destination, when the color machine button 44 is selected, the ON button of the SIP-facsimile transmission is automatically selected in response to the selection. In the situation where the monochrome machine button 45 is selected, a user is able to select either the ON button or the OFF button of the SIP facsimile transmission. Namely, the color mode transmission is surely conducted in the SIP-facsimile and the monochrome mode transmission is able to conducted in either transmission methods of the SIP-facsimile or the G3-facsimile according to the user selection.

In the destination column 43, when dial information such as "tone" and "pause", which is special dial information to the destination of G3-facsimile is inputted, the color machine button cannot be selected onward. Namely, after it is identified that the target receiver is a G3-facsimile machine, the party's destination is not be able to be registered as a color machine. Thus, it is prevented that the G3-facsimile machine is erroneously registered as a color machine.

When the OK button 48 is operated, it is preferable to check the input contents of the abbreviated destination registration screen 40, a color button 44 and the selection state of the ON button 46 of the SIP-facsimile transmission to determine whether there is a contradiction associated with the selection. If there is a contradiction, it is preferable to issue warning to the user or the operator. For example, under the situation where the color machine button 44 is selected, when "tone" or "pause" peculiar dial information to the destination of the G3-facsimile is inputted in the destination column 43, it is preferable to issue the warning that there is a contradiction in the contents to be registered to the user or the operator.

Next, the selection of the transmission destination will be described.

Figure 4:
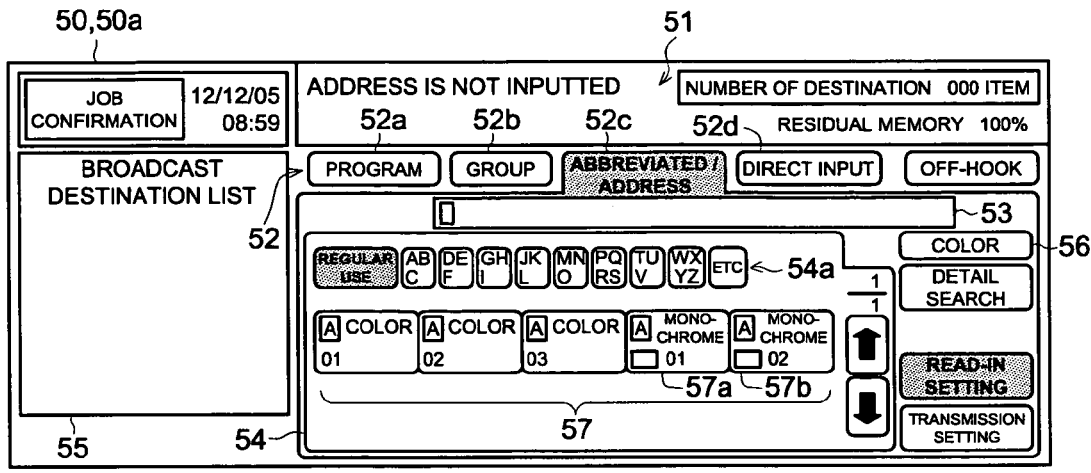
FIGS. 4(a) and 4(b) illustrate a drawing showing the changing aspects of the destination candidates displayed on the destination selection screen, the destination candidates being changed in response to the destination selection screen and the selection of the color/monochrome mode.
Figure 4:
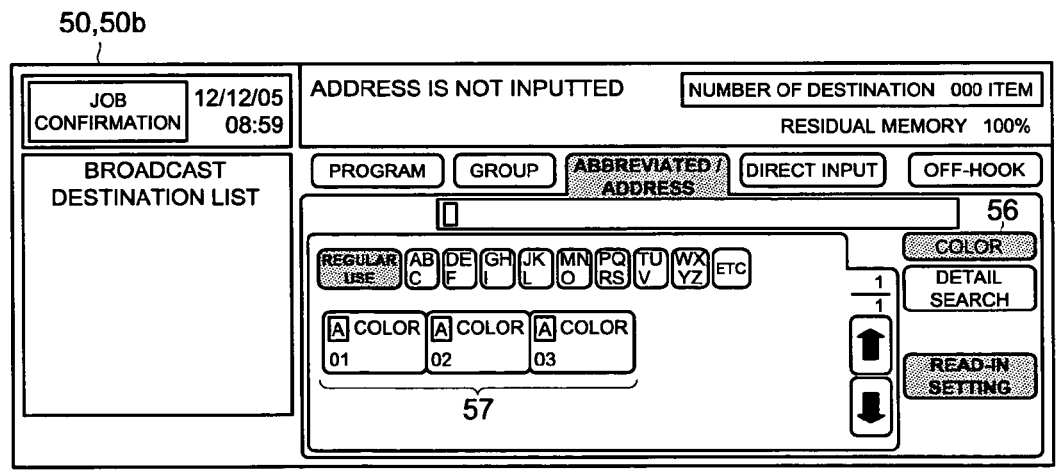

FIG. 4(a) illustrates an example of a destination selection screen 50 displayed in the display section 18 of the MFP 10. The destination selection screen 50 is a screen for selecting the destinations for the broadcast transmission. In the destination selection screen 50, disposed are a message display column 51, a plurality of tags 52 for selecting the selection method for the destination, an input number display column 53, a destination candidate display column 54, a broadcast destination list display column 55 and a color button 56 for selecting that the transmission mode is set in the color mode or the monochrome mode.

In the message display column 51, advices on the destination selection to a user, notices and warnings are displayed. A program tag 52a is a tag to be pressed when selecting the transmission destination by using the program destination. A group tag 52b is a tag to be pressed when selecting transmission destination by using the group destination. An abbreviated/destination tag 52c is a tag to be pressed when selecting the transmission destination by using the abbreviated destination. A direct input tag 52d is a tag to be pressed when selecting the transmission destination by using the direct input operation. FIG. 4(a) illustrates the destination selection screen 50a when selecting the abbreviated/destination tag 52c.

An input number display column 53 displays a telephone number, which has been directly inputted. Even when the group tag 52b and the abbreviated/destination tag 52c are selected, it is possible to set the broadcast destinations by directly inputting the telephone number in the input number display column 53.

In the destination candidate display column 54, candidates of the destinations from which a user can select the target destination are displayed in a list form. On the top of the destination candidate display column 54, an index keys 54a for selecting the capital character of the destination are disposed. Destination selection buttons 57 corresponding to all or a part of the abbreviated destinations having the capital character, which has been selected by the index keys 54a are lined up under the index keys 54a. When any one of the destination selection buttons 57 displayed in the destination candidate column 54 is pressed, the destination corresponding to the destination selection button 57 is selected as one of the destinations and is displayed in the broadcast destination list display column 55. In the broadcast destination list display column 55, the destinations selected as the broadcast destination are listed and displayed.

Next, the operation related to the broadcast destination selection operation will be described below.

Figure 5:
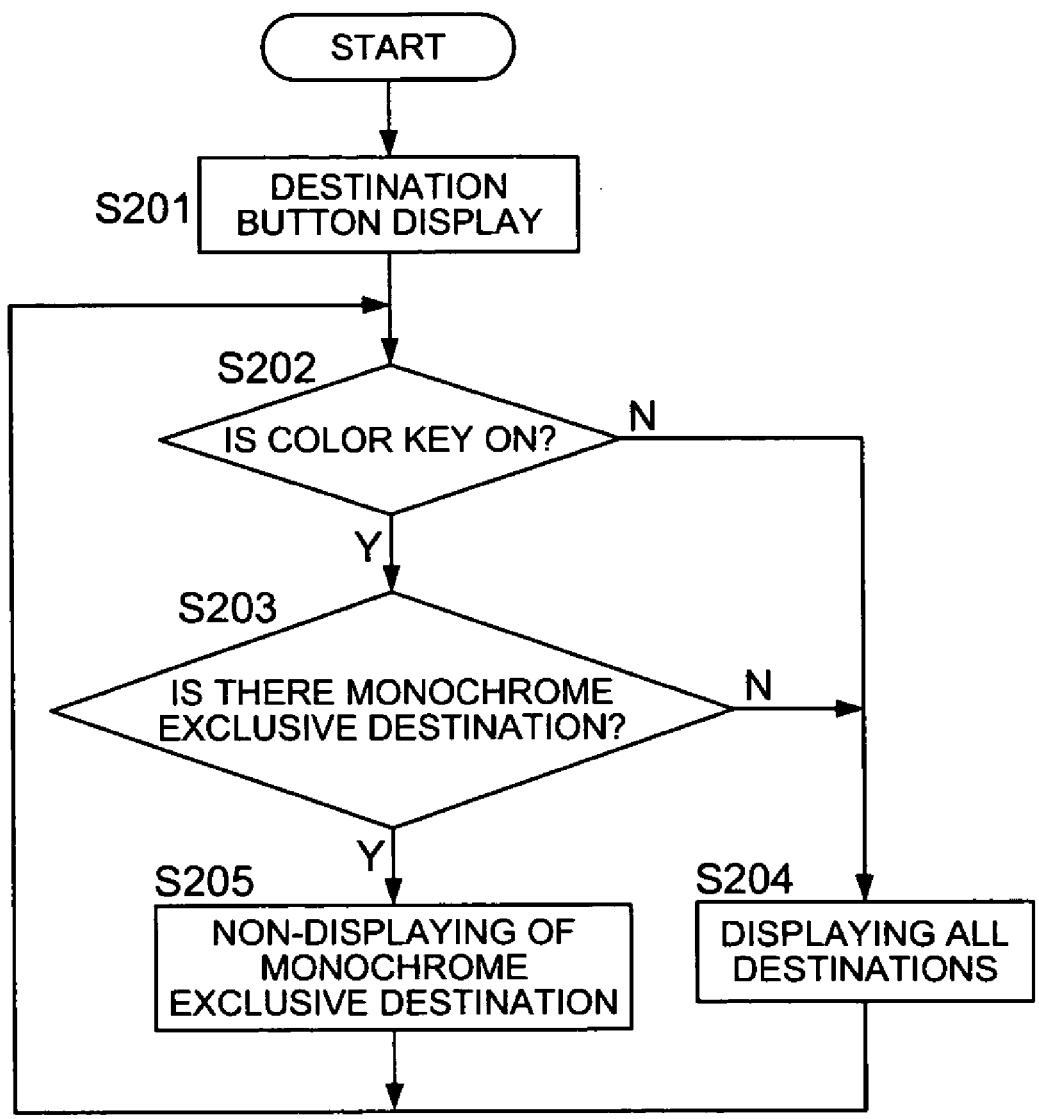
FIG. 5 illustrates a flowchart showing the display control process of a destination candidate list under the situation prior to the selection of the broadcast destination.

FIG. 5 illustrates a flowchart of the process of the display control for the destination candidates prior to the destination selection. When selecting the broadcast destinations, a user operates the abbreviated/destination tag 52c and further operates any one of the index keys 54a to display a destination selection button 57 of the destination corresponding to a destination candidate display column 54 (a step S201). At this moment, when the color button 56 is OFF (a monochrome mode is selected as the transmission mode) (a step S202; N), as illustrated in FIG. 4(a), the destination selection buttons 57 of all destinations having capital selected by the index keys 54a are displayed in the destination candidate display column 54 (a step S204). Namely, both of the destinations corresponding to the color machine and the destinations corresponding to the monochrome machine are displayed.

On the other hand, when the color button 56 is ON (a color mode is selected as the transmission mode) (a step S202; Y), the CPU 11 checks whether there is a destination registered as a monochrome machine among the abbreviated destinations having capital character selected by the index keys 54a (a step S203). The determination is conducted based on the information related to the abbreviated destination registration stored in the nonvolatile memory 14. When there is a destination of a monochrome machine (the step S203; Y), the CPU 11 designates all destinations of the monochrome machine to non-displaying (a step S205).

For example, when the color button 56 is turned on under the situation as illustrated in FIG. 4(a), destination selection buttons 57a and 57b corresponding to the destinations of the monochrome machine turn into non-displaying and becomes the situation as illustrated in FIG. 4(b) (destination selection screen 50b). Thus, under the situation where the color mode has been selected, the destination of the monochrome machine will not be selected. Accordingly, a user can easily select only the destination, which has a receiving capability of the color machine without error.

When the color button 56 is turned on, if there is no destination registered as a monochrome machine (the step S203; N), the destination selection buttons 57 of all destinations are displayed in the destination candidate display column 54 (a step S204).

When the color button 56 is turned off under the situation as illustrated in FIG. 4(b) and the monochrome mode is selected, the operation shifts to the situation as illustrated in FIG. 4(a). Namely, every time the color button 56 is turned on and off, the program in the CPU 11 is arranged to switch the display contents of the destination selection screen 50 between the situation where all the destinations are displayed as illustrated in FIG. 4(a) and the situation where the destinations of the monochrome machine becomes non-displaying as illustrated in FIG. 4(b).

Next, the operation for selecting a color mode/a monochrome mode by operating the color button 56 after having selected several destinations as broadcast destinations will be described.

Figure 6:
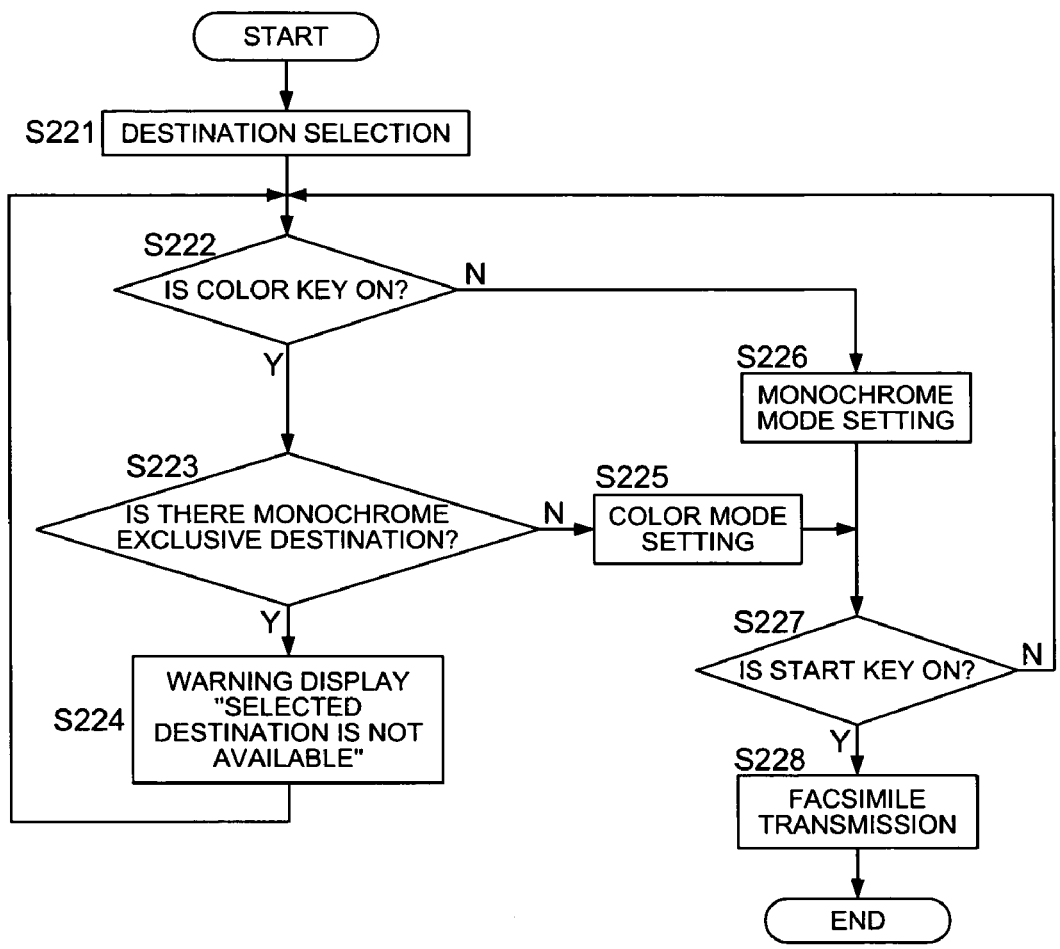
FIG. 6 illustrates a flowchart showing the display control process of the destination candidate list in the situation after the selection of the broadcast destination.
Figure 7:
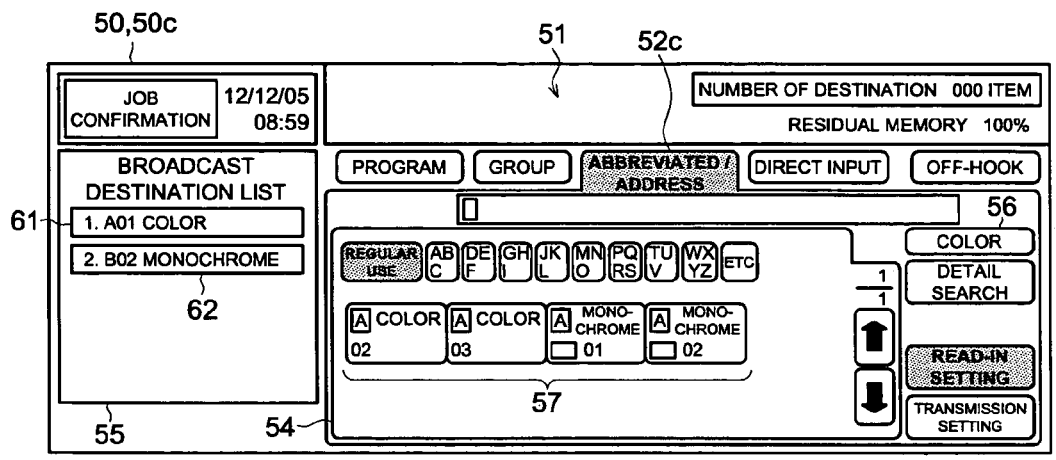
FIGS. 7(a) and 7(b) illustrate an aspect of displaying warning associated with the operation for changing the destination selection screen after the selection of the broadcast destination and the transmission mode.
Figure 7:
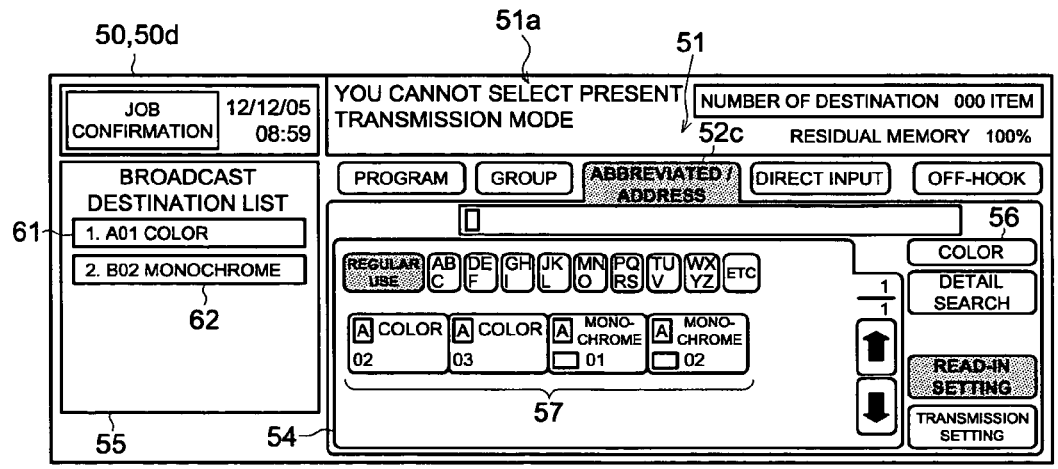

FIG. 6 illustrates a flowchart showing the process described above. FIG. 7(a) illustrates an example of the destination selection screen 50c after having selected several destinations as the broadcast destinations. When a user presses any one of destination selection buttons 57 displayed in the destination candidate display column 54, the broadcast destinations are selected (a step S221). Then, as illustrated in FIG. 7(a), the situation where selected destinations 61 and 62 are displayed in the broadcast destination list column 55 is formed.

When the color button 56 is turned on (the color mode is selected) under the situation where several broadcast destinations have been selected (a step S222; Y), the CPU 11 checks whether there is a monochrome exclusive destination (a monochrome machine) in the broadcast destinations, which have been already selected (a step S223). When there is a monochrome exclusive destination (the step S223; Y), the CPU 11 warns and displays to the effect that the color mode cannot be selected (a step S224).

For example, as illustrated in FIG. 7(a), if the color button 56 is turned on under the situation where the destination 61 of a color machine and the destination 62 of a monochrome machine have been selected, as shown in the destination selection screen 50d illustrated in FIG. 7(b), predetermined warning message 51a is displayed to notify the user that the change to the color mode can not be conducted under the condition of the destination, which has been presently selected.

When there is no monochrome exclusive destination in the broadcast destinations (the step S223; N), the color mode selection operation is permitted and the CPU 11 sets the transmission mode into the color mode (a step S225). After the color mode has been set, as the same as the case illustrated in FIG. 4(b), the monochrome exclusive destination is turned off (non-displaying) in the destination candidate display column 54 and the monochrome machine can not be selected as a broadcast destination onward.

In the case that the color button 56 is turned off and the monochrome mode is selected (the step S222; N), the transmission mode is set into the monochrome mode (a step S226).

When the start button (not shown) is operated under the condition where no warning is displayed in the message display column 51 after at least one broadcast destination has been selected, (a step S227; Y), facsimile transmission (broadcast transmission) is executed against the selected broadcast destination (a step S228) and a series of transmission process finishes (END).

Figure 8:
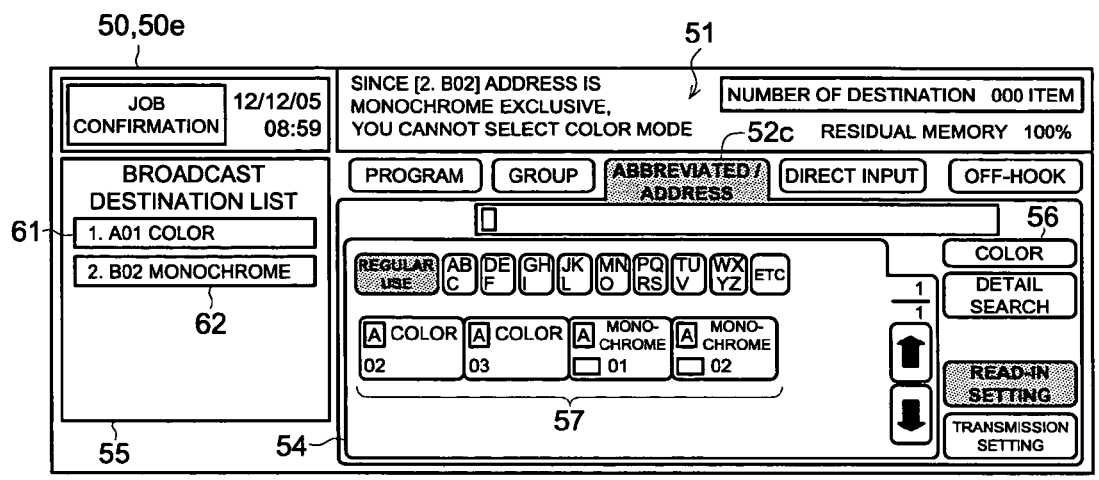
FIG. 8 illustrates a front view of an example of the destination selection screen informing the destination, which causes the warning display, and detailed information of the cause.

When conducting the warning display operation, as illustrated in the destination selection screen 50e of FIG. 8, it is preferable that the destination, which is a cause of the warning display, and the contents of the cause are informed to the user. According to the example illustrated in FIG. 8, the message to the effect that "since the destination 62 of [2.B02], which is displayed in the broadcast destination list display column 55, is a monochrome exclusive machine, the change to the color mode can not be conducted" is displayed in message display column 51. The user is able to remove the destination, which is a cause of the warning from the broadcast destinations based on the displayed warning message.

In the examples illustrated in FIGS. 6, 7(a) and 7(b), the CPU 11 determines whether the transmission mode selection is proper against the all destinations, which have been selected until that time, at the time when the color button 56 is operated. However it may be determined whether the selection of the transmission mode is proper every time the broadcast destination is selected.

Figure 9:
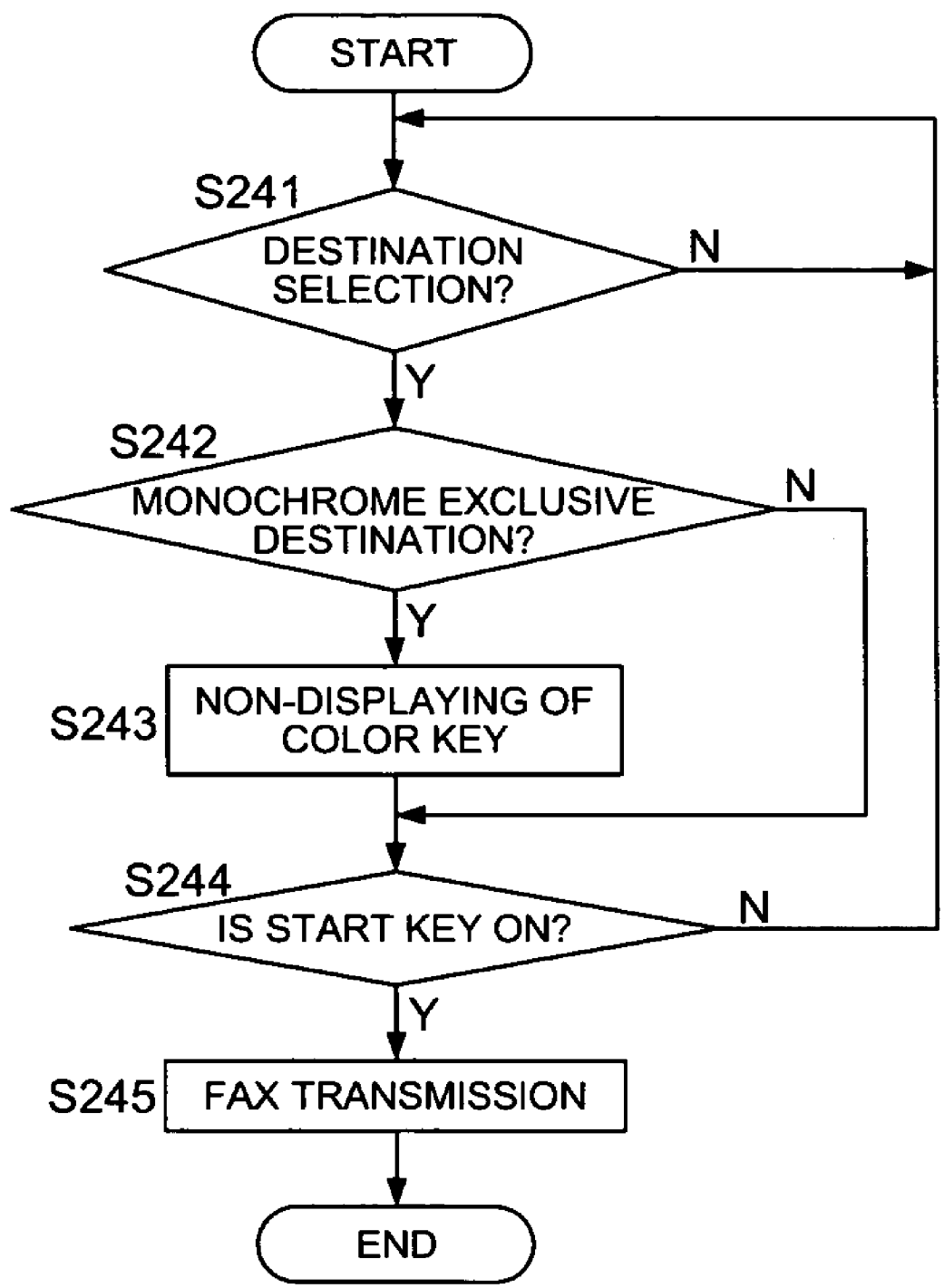
FIG. 9 illustrates a flowchart showing the display control process for sequentially determining whether the transmission mode is changed according to the destination selection.

FIG. 9 illustrates a flowchart showing the display control process for sequentially determining whether the transmission mode is changed according to the destination selection. When any one of the destination selection buttons 57 displayed in the destination candidate display column 54 is selected (a step S241; Y), the CPU 11 determines whether the destination corresponding to the destination selection button 57 is a monochrome exclusive destination (a step S242). When the selected destination is a monochrome exclusive destination (the step S242; Y), the CPU 11 turns the color button 56 into gray-out or non-displaying to inhibit the selection operation to the color mode (a step S 243) and continues to accept the selection operation under the same condition until the start key is operated (a step S244; N).

When the selected destination is not a monochrome exclusive destination (the step S242; N), the CPU 11 continues to accept the destination selection operation under the same display condition until the start key is operated (the step S244; N).

When the start key is operated (the step S244; Y), the CPU 11 executes the facsimile communication to the broadcast destinations, which have been selected (broadcast transmission) (a step S245), and finishes a series of transmission processes.

Figure 10:
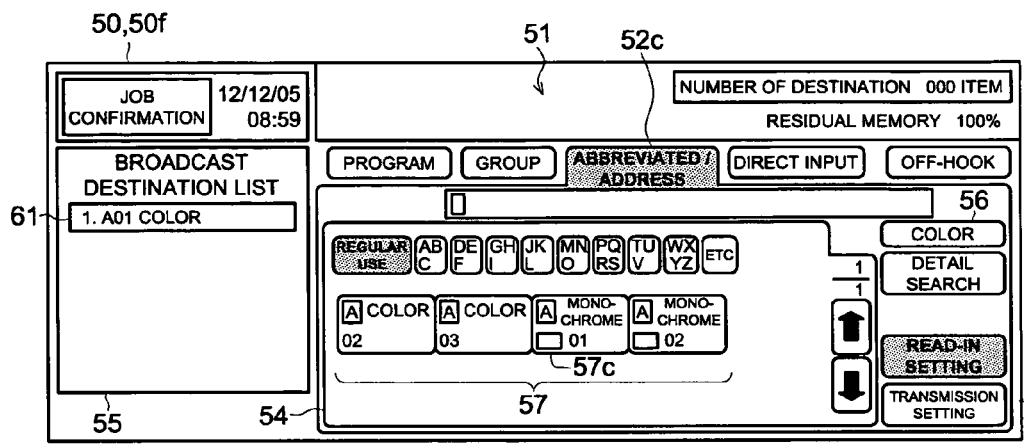
FIGS. 10(a) and 10(b) illustrate the explanation of the destination selection screens before and after the selection of monochrome exclusive destination.
Figure 10:
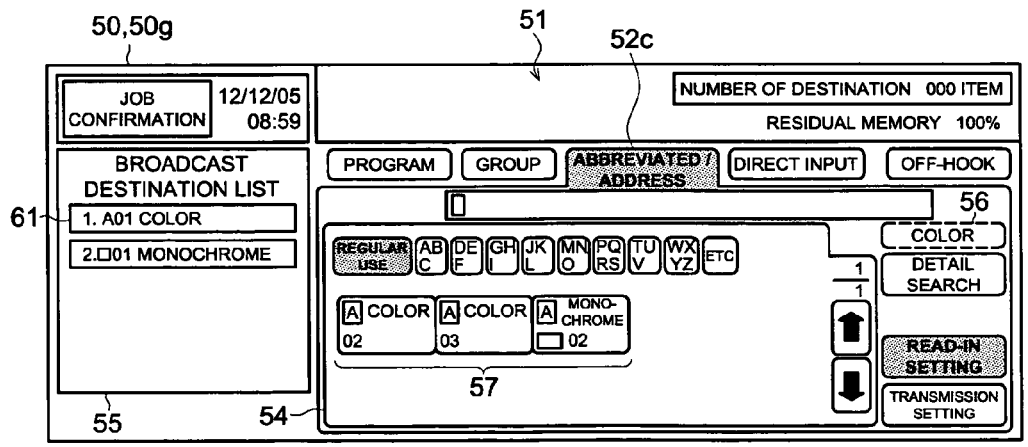

FIG. 10(a) illustrates a destination selection screen 50f before conducting the monochrome exclusive destination selection. FIG. 10(b) illustrates the destination selection screen 50g after conducting the monochrome exclusive destination selection (the destination selection button 57c illustrated in FIG. 10(a)). In FIG. 10(b), the color button 56 is gray-out (a dotted line in the FIG. 10(b)) and cannot be operated.

The warning, to the effect that once this destination is selected the change to the color mode will not be made onward, may be displayed in the message display column 51, when a destination is selected. Further, when displaying the warning, it is possible that the CPU 11 may ask the user whether the currently conducted destination selection is valid or should be cancelled. And when the valid operation is confirmed, it is possible to set the color button 56 to gray-out to inhibit the operation of the color button 56.

In the group destination registration, the same as the broadcast destination selection, the display contents are changed in response to the transmission mode and the destination selection situation.

Figure 11:
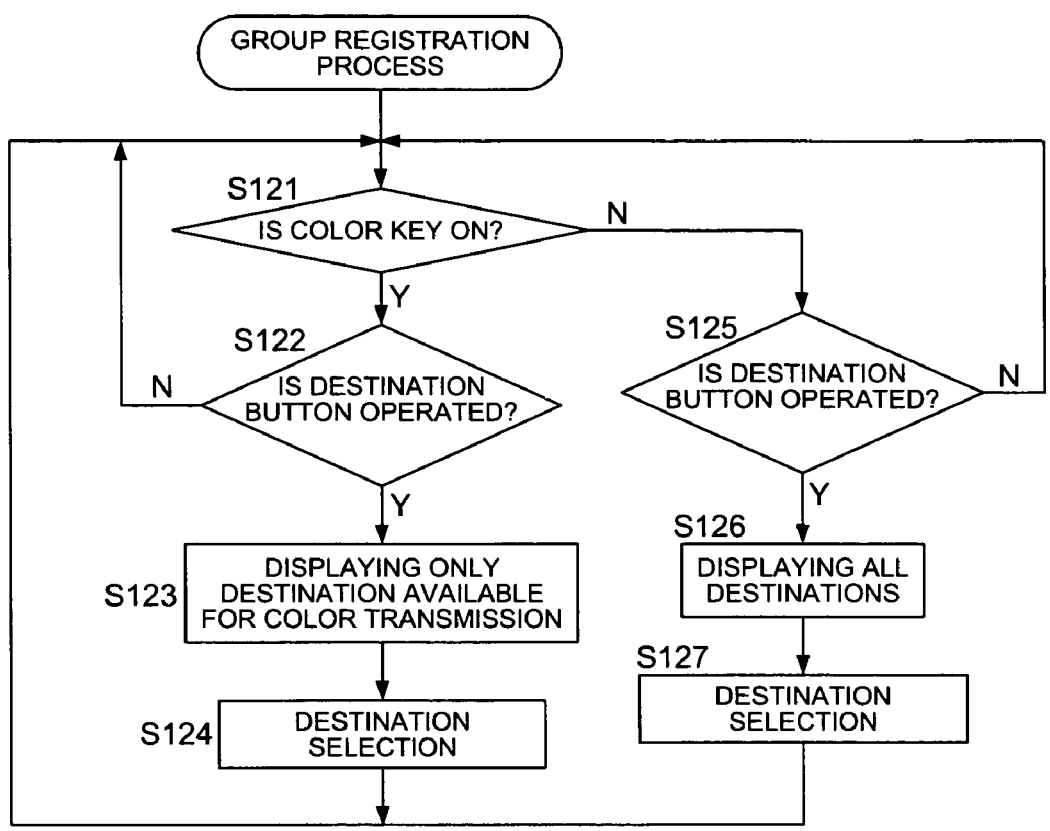
FIG. 11 illustrates a flowchart showing a registration process of a group destination registration.
Figure 12:
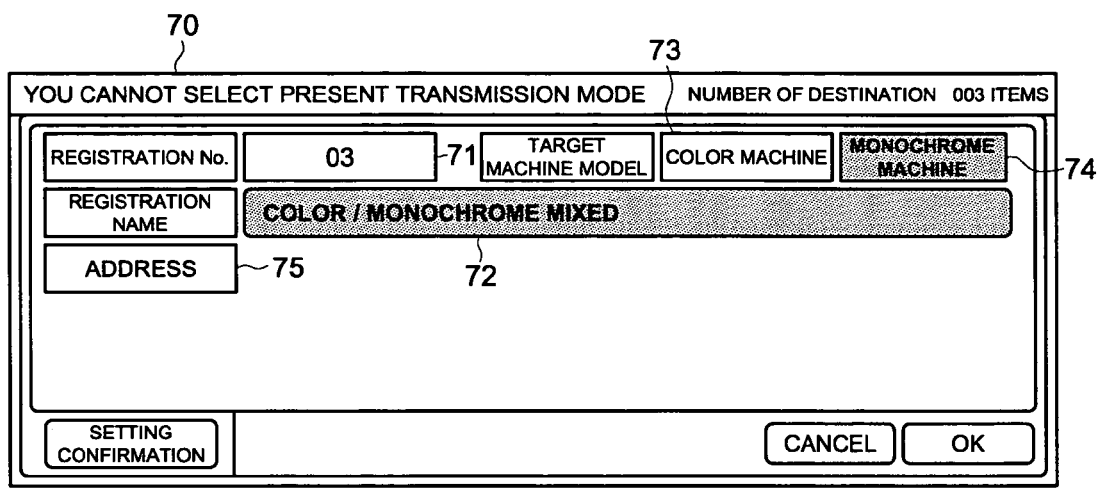
FIG. 12 illustrates a front view of an example of the group destination registration screen.

FIG. 11 illustrates the flow chart of the group destination registration process and FIG. 12 illustrates an example of a group destination registration screen 70. In a registration number column 71, a group number under registration is displayed. In a registration name column 72, a group name to be registered in response to the group number is displayed. A color machine button 73 is an operation button for registering the group as a color machine group and a monochrome machine button 74 is an operation button for registering the group as a monochrome machine group. The color button 73 or the monochrome button 74 is alternatively selected. The selected button and the non-selected button are displayed so that the selected button and the non-selected button are identified each other by changing the color of the characters and background of the selected button and non-selected button. A destination button 75 is an operation button for displaying a destination candidate to be registered as a group registration.

When destination button 75 is operated (the step S122; Y), under the situation where the color machine button 73 has been selected (the step S121; Y) in the group destination registration screen 75, only destinations registered as a color machine (abbreviated destinations) are displayed as destination, which can be selected by the user (the step S123). The user selects the destination to be registered as the group member among the displayed destinations capable of handling the color capability (a step S124).

When destination button 75 is operated (step S125; Y), under the situation where the monochrome machine button 74 has been selected (the step S121; N) in the group destination registration screen 70, regardless of a color machine, or a monochrome machine, all the destinations (abbreviated destinations) are displayed as destinations, which a user can select (a step S126). The user selects the destination to be registered as the group member from all the destinations, which have been displayed (a step S127).

In the example described above, the process is arranged to change the destinations from which the user can select in response to the selection status of the transmission mode by the color machine button 73 and the monochrome machine button 74. However, the process may be arranged to limit the registration of the receiving capability information (in this embodiment, information specifying a color machine or a monochrome machine), which relates to the property of the group (whether it is color group or not) in response to the destination selected by the user. For example, when the destination of the color machine and the destination of the monochrome machine are mixed and selected together as a group member, it is possible to prohibit to select the color group by setting the color machine button 73 into gray-out or non-displaying. It is also possible to give warning that the color mode cannot be set, when the color machine button 73 is pressed down, or to inform the user of the destination, which becomes a cause of that the setting cannot be performed and the contents of the cause.

The same as the operations as illustrated in FIGS. 9, 10(a) and 10(b), the process may be arranged to switch the propriety of the operation of the color machine button 73 in response to the contents of the selection (display/non-display) in the real time, every time when the destination to be added in the group is selected.

An embodiment of the present invention has been described above by using drawings. The present invention is not limited to the above embodiment and various changes, addition and modification may be made without departing from the scope of the invention.

For example, in this embodiment, the color mode and the monochrome mode are described as examples of the transmission mode. However, the present invention is not limited to this example. For example, when transmitting the document of a large size such as A3 in an original size is available, it is possible to set a transmission mode based on the determination whether transmitting the document in an original size (A3 size) is conducted or not in an original size. And the destination selectable by the user, and the transmission mode selectable by the user, may be changed in response to the receiving capability of A3 original document in the target destination.

In this embodiment, the process is arranged to allow the user to register that each destination is a color machine or a monochrome machine when registering the abbreviated destinations and to determine whether the target machine is a color machine or a monochrome machine based on the registered contents of the abbreviated destination. However, the method for obtaining the information regarding the receiving capability of the target machine may be conducted in a different method. For example, the process may be arranged to obtain the receiving capability information of whether the target machine is a color machine or a monochrome machine when establishing the communication, and to automatically register the information.

In this embodiment, the process is arranged to be able to select any one of the color machine and the monochrome machine (monochrome exclusive machine) when the transmission mode is set in a monochrome mode. However, the process may be arranged to be able to select only a monochrome machine. Other than this, when the color mode has been selected, the process may be arranged to be able to allow user to select only the destination, which has a capability to correspond to the network facsimile such as the SIP-facsimile. Further, the process may be arranged not to be able to set the transmission mode into a color mode, when the destination, which does not have a capability to correspond to the network facsimile is included in the selected destinations.

In the registration screen of the program destination, the transmission mode, which the user can select, and the control related to the destination are arranged to be the same as the group destination and the broadcast destination.

In this embodiment, when setting the transmission mode under the condition where the destination has been selected, if any one of the selected destinations cannot correspond to the transmission mode to be set up, the process is arranged to prohibit setting of the transmission mode. However, the process may be arranged to automatically remove the destination, which cannot correspond to the transmission mode to be set from the destinations, which have been already selected, to accept the selection of the transmission mode. In this case, the process may be arranged to inform the user of the existence of the destination to be deleted due to the selection of the transmission mode and of the destination to be removed, and to remove the destination after obtain the approval from the user.

From the above description, it can be understood that the configurations below achieve the object of the present invention.

(1) An image transmission apparatus, which transmits image data to a designated destination, the image transmission apparatus including a mode selection section for receiving a transmission mode selection and a destination selection section for receiving a destination selection, wherein the destination selection section enables to select a destination corresponding to the transmission mode, which is selected by the mode selection section.

According to the configuration described above, it becomes possible to select the destination corresponding to the transmission mode, which has been selected. The transmission mode, which relates to the change of a user selectable destination, may be a mode related to the receiving capability of the target apparatus, for example, a color mode/a monochrome mode, a transmission mode related to a print size, such as a mode for transmitting a large sized document as it is, and a transmission mode related to a resolution, such as the transmission mode designating an ultra-high resolution.

(2) The image transmission apparatus of configuration (1), wherein the destination selection section makes only the destination user-selectable, the destination having a receiving capability corresponding to the transmission mode selected by the mode selection section.

According to the configuration (2), only a destination having receiving capability corresponding to the transmission mode selected by the mode selection section can be selectable. For example, in cases where a color mode has been selected, only the destination, which corresponds to the color mode (destination where the receiving apparatus has color capability), can be selectable.

(3) The image transmission apparatus of configuration (1) or (2), wherein the mode selection section makes a color mode and a monochrome mode user-selectable.

(4) The image transmission apparatus of configuration (3), wherein in a state where the color mode has been selected, the destination selection section makes only the destination corresponding to the color mode user-selectable.

According to the configuration (4), since a monochrome exclusive destination cannot be selected in cases where color mode has been selected, only the color machine can be selected simply and surely.

(5) The image transmission apparatus of configuration (3), wherein in a state where the color mode has been selected, the destination selection section makes only the destination corresponding to a network facsimile user-selectable.

According to the configuration (5), the image transmitting apparatus is equipped with both a network facsimile function capable of corresponding to color transmission and a transmission function of such as G-3 facsimile not corresponding to color transmission, and in the state that color mode has been selected, only the destination corresponding to the network facsimile can be user-selectable.

(6) The image transmission apparatus of configuration (3), wherein in a state where the monochrome mode has been selected, the destination selection section makes only the destination exclusive to monochrome user-selectable.

According to the configuration (6), in the state that the monochrome mode has been selected, the destination, corresponding only to the monochrome mode and not to the color mode, is user-selectable.

(7) The image transmission apparatus of configuration (3), wherein in a state where the monochrome mode has been selected, the destination selection section makes both the destination corresponding to the color mode and the destination corresponding to the monochrome mode user-selectable.

According to the configuration (7), since many of the apparatuses corresponding to the color mode are capable to receive in monochrome mode as well, in the state that the monochrome mode has been selected, it is made capable to select both the destination corresponding to the color mode and the destination corresponding to the monochrome exclusive mode.

(8) The image transmission apparatus of configuration (3), wherein in a state where the monochrome mode has been selected, the destination selection section makes all of the destination user-selectable.

According to the configuration (8), in the state that the monochrome mode has been selected, it is made capable to select all the destinations irrespective of color, monochrome, G3, and network facsimile. This is due to the fact that the monochrome receiving function is common to all kinds of facsimile apparatus.

(9) An image transmission apparatus for transmitting an image data to a designated destination, the image transmission apparatus including a mode selection section for receiving a transmission mode selection and a destination selection section for receiving a destination selection, wherein the mode selection section enables to select an transmission mode corresponding to a destination selected by the destination selection section.

According to the configuration (9), it becomes possible to select the transmission mode corresponding to the destination, which has been selected. For example, when the destination, which does not have a capability of handling a color mode, is included among the destinations, which have been selected, it becomes impossible to select a color mode as a transmission mode. The transmission mode, by which the propriety of user selection corresponding to the selected destination is changed, may be a mode related to the receiving capability of the target apparatus. For example, the mode may be, other than the color/monochrome mode, a transmission mode related to a print size, such as a mode for transmitting a large sized document as it is, and a transmission mode related to a resolution, which designates an ultra-high resolution.

(10) The image transmitting apparatus of configuration (9), wherein the mode selection section makes only the transmission mode, to which all destinations having been selected by the destination selection section are capable to correspond, user-selectable.

According to the configuration (10), it becomes possible to select only the transmission mode, which is capable to be handled at all the destinations when plural destinations have been selected, and a transmission mode, which does not correspond to any one of the destination having been selected, is not user-selectable.

(11) The image transmitting apparatus of configuration (9) or (10), wherein the mode selection section makes a color mode and a monochrome mode user-selectable.

(12) The image transmitting apparatus of configuration (11), wherein the mode selection section makes the color mode as the transmission mode not user-selectable, in cases where a destination, which is not corresponding to the color mode, is included in a destination group having been selected by the destination selection section.

(13) The image transmitting apparatus of configuration (11), wherein the mode selection section makes the color mode as the transmission mode not user-selectable, in cases where a destination, which is not corresponding to a network facsimile, is included in a destination group having been selected by the destination selection section.

According to the configuration (13), the image transmitting apparatus is equipped with both a network facsimile function capable of corresponding to color transmission and a transmission function of such as G3 facsimile not corresponding to color transmission, and in cases where a destination, which is not corresponding to network facsimile, is included in the selected destination the color mode selection becomes impossible.

(14) The image transmitting apparatus of any one of configurations (11) to (13), wherein when a destination selection state at the destination selection section has changed, the mode selection section changes a user-selectable transmission mode, according to the destination selection state having been changed.

According to the configuration (14), the user selectable transmission mode changes according to need every time when a destination is selected. For example, in cases where after destination A (color) and destination B (color) are selected, destination C (monochrome) is selected, at the time when destination C is selected the color mode selection is prohibited by such as graying out of the operation button.

(15) The image transmitting apparatus of any one of configurations (9) to (13), wherein the mode selection section, when receiving an operation of the transmission mode selection, determines whether to allow or not the transmission mode selection according to the destination being selected at the time of receiving the operation.

According to the configuration (15), propriety of the selection operation of the transmission mode to the selected destination is collectively determined at the time of receiving the selection operation. For example, after the selections of destination A (color), destination B (monochrome), and destination C (color) are conducted, when an operation button for color mode is operated, at the time of operation, the mode selection section collectively determines if destinations A, B, and C are possible to correspond the color mode. And in this case, since destination B is not capable to correspond the color mode, the selection of color mode is prohibited.

(16) The image transmitting apparatus of configurations (15), wherein, when the transmission mode selection is not allowed, the mode selection section gives a warning to a user to the effect that the selection is not allowed.

According to the configuration (16), the fact that changing operation of the transmission mode is prohibited is notified to the user such as by displaying a warning message.

(17) The image transmitting apparatus of configurations (15), wherein, when the transmission mode selection is not allowed, the mode selection section notifies to a user of a reason why the selection is not allowed, and/or a destination causing non-allowance.

According to the configuration (16), when a changing operation of the transmission mode is prohibited, the destination causing the prohibition and detailed reason of the prohibition are notified. For example, after the selections of destination A (color), destination B (monochrome), and destination C (color) are conducted, when an operation button for color mode is operated, a notification to the effect that the changing operation to color mode is prohibited since the destination B is not corresponding to the color mode.

(18) The image transmitting apparatus of any one of configurations (1) to (17), the destination selection section makes a destination, which cannot be selected by a user, in non-displaying state on a destination selection screen.

According to the configuration (16), the destination not selectable by a user is made non-displaying state on the destination selection screen. For example, in the state that monochrome mode is selected, when the transmission mode is switched to the color mode while displaying a destination list, the destination not corresponding to the color mode distinguishes from the destination list on display. Alternatively, in cases where the color mode is selected, when the destination list is newly displayed, the destination list containing only the destination capable of corresponding to the color mode is displayed.

(19) The image transmitting apparatus of any one of configurations (1) to (18), wherein the mode selection section makes a mode, which is not user-selectable, in non-displaying state on a mode selection screen.

According to the configuration (19), in cases where a user selectable transmission mode is restricted according to the destination having been selected, the selection button for the transmission mode, which is not selectable by the restriction, is not displayed on the transmission mode selection screen.

(20) The image transmitting apparatus of any one of configurations (1) to (19), further comprising a registration section for receiving a destination registration, wherein the registration section registers the destination correlating with information whether the destination is corresponding to color machine or to monochrome machine.

According to the configuration (20), when registering the destination information with abbreviated number and the like, the information whether or not the destination is for color machine or the destination is corresponding to color mode is registered.

(21) The image transmitting apparatus of configurations (20), wherein the registration section registers ON operation or OFF operation for a network facsimile transmission with regard to each of the destination.

According to the configuration (21), when registering the destination information with abbreviated number and the like, information of ON or OFF for a network facsimile transmission with regard to each of the destination is also registered. The registered information is utilized for determination or control such as judgment of selectable user destination or change of a transmission mode.

(22) The image transmitting apparatus of configuration (21), wherein the registration section automatically registers ON operation for a network facsimile transmission with regard to the destination, when the destination, in the course of registration, is selected to be corresponding to the color mode.

According to the configuration (22), since most of the network facsimile corresponds to color function, ON for the network facsimile transmission is automatically selected when the color mode is selected.

(23) The image transmitting apparatus of configuration (21), wherein the registration section makes ON operation or OFF operation selectable for a network facsimile transmission with regard to the destination, when the destination, in the course of registration, is selected to be corresponding to monochrome mode.

According to the configuration (22), in cases where the destination is for monochrome machine, since monochrome transmission is capable by the other communication system such as G3 facsimile as well as by the Internet facsimile, ON/OFF for a network facsimile transmission is made user selectable.

(24) The image transmitting apparatus of any one of configurations (20) to (23), wherein the registration section disables a selection of color mode with regard to the destination, when dial information special to G3 facsimile is inputted regarding the destination in the course of registration.

According to the configuration (24), with regard to the destination for G3 facsimile transmission, registration corresponding to a color machine is prohibited.

(25). The image transmitting apparatus of any one of configurations (1) to (24), wherein the destination selection section receives a destination selection for a broadcast transmission.

According to the configuration (25), only the destination capable for corresponding to the transmission mode requested by a user can be designated as the destination for broadcast transmission in a simple and sure way.

(26) The image transmitting apparatus of any one of configurations (1) to (24), wherein the destination selection section receives a destination selection for a group registration.

According to the configuration (26), since group registration is a registration where a plurality of destinations is collectively registered, by selecting a registered group, broadcast transmission is conducted to the plurality of destinations included in the group. Then, only the destination corresponding to a special transmission mode can be simply and surely selected and registered in the group.

According to the image transmission apparatus of the present embodiment, it becomes possible to easily designate only a destination, which has a capability of handing the transmission mode selected by the transmitter without an error. For example, it becomes possible to easily designate only the destinations, which are capable of corresponding to a color mode as broadcast destinations, without an error. Thus, it becomes unnecessary to conduct processing of color/monochrome conversion for a destination having a monochrome apparatus when sending a document, which has been read out in a color mode. Accordingly, it allows reducing the cost of the apparatus. Further, it becomes possible to easily designate only the destination, which has a capability of handing the mode, which the transmitter specifies, without an error.

What is claimed is:

1. An image transmission apparatus for transmitting image data to a designated destination, comprising:
   a mode selection section for receiving a transmission mode selection, wherein the mode selection section makes a color mode and a monochrome mode user-selectable; and
   a destination selection section for receiving a destination selection, wherein the destination selection section enables selection of a destination according to the transmission mode selected by the mode selection section;
   wherein in a state in which the color mode has been selected, the destination selection section makes only a destination corresponding to the color mode user-selectable; and
   wherein in a state in which the monochrome mode has been selected, the destination selection section makes both a destination corresponding to the color mode and a destination corresponding to the monochrome mode user-selectable.

2. The image transmission apparatus of claim 1, wherein in a state in which the color mode has been selected, the destination selection section makes only a destination corresponding to a network facsimile user-selectable.

3. The image transmission apparatus of claim 1, wherein the destination selection section puts a destination, which is not user-selectable, in a non-displaying state on a destination selection screen.

4. The image transmission apparatus of claim 1, wherein the destination selection section receives a destination selection for a broadcast transmission.

5. The image transmission apparatus of claim 1, wherein the destination selection section receives a destination selection for a group registration.

6. An image transmission apparatus for transmitting image data to a designated destination, comprising:
- a mode selection section for receiving a transmission mode selection;
- a destination selection section for receiving a destination selection, wherein the destination selection section enables selection of a destination in accordance with the transmission mode selected by the mode selection section; and
- a registration section for receiving a destination registration, wherein the registration section registers the destination by correlating the destination with information about whether the destination corresponds to a color mode or to a monochrome mode;
- wherein the registration section registers one of an ON operation and an OFF operation for a network facsimile transmission with regard to each of the destinations; and
- wherein the registration section automatically registers the ON operation for a network facsimile transmission with regard to a destination, when the destination, in the course of registration, is selected to correspond to the color mode.

7. An image transmission apparatus for transmitting image data to a designated destination, comprising:
- a mode selection section for receiving a transmission mode selection;
- a destination selection section for receiving a destination selection, wherein the destination selection section enables selection of a destination in accordance with the transmission mode selected by the mode selection section; and
- a registration section for receiving a destination registration, wherein the registration section registers the destination by correlating the destination with information about whether the destination corresponds to a color mode or to a monochrome mode;
- wherein the registration section registers one of an ON operation and an OFF operation for a network facsimile transmission with regard to each of the destinations; and
- wherein the registration section makes one of the ON operation and the OFF operation selectable for a network facsimile transmission with regard to a destination, when the destination, in the course of registration, is selected to correspond to the monochrome mode.

8. An image transmission apparatus for transmitting image data to a designated destination, comprising:
- a mode selection section for receiving a transmission mode selection;
- a destination selection section for receiving a destination selection, wherein the destination selection section enables selection of a destination in accordance with the transmission mode selected by the mode selection section; and
- a registration section for receiving a destination registration, wherein the registration section registers the destination by correlating the destination with information about whether the destination corresponds to a color mode or to a monochrome mode;
- wherein the registration section disables a selection of the color mode with regard to a destination, when dial information special to G3 facsimile is inputted regarding the destination in the course of registration.

9. An image transmission apparatus for transmitting image data to a designated destination, comprising:
- a mode selection section for receiving a transmission mode selection, wherein the mode selection section makes a color mode and a monochrome mode user-selectable; and
- a destination selection section for receiving a destination selection;
- wherein the mode selection section enables selection of a transmission mode according to the destination selected by the destination selection section;
- wherein in a case in which a destination selected by the destination selection section does not correspond to the color mode, the mode selection section makes the color mode as the transmission mode not user-selectable; and
- wherein in a case in which a destination selected by the destination selection section does not correspond to a network facsimile, the mode selection section makes the color mode as the transmission mode not user-selectable.

10. The image transmission apparatus of claim 9, wherein when a destination selection state of the destination selection section has changed, the mode selection section changes the selected transmission mode, according to the destination selection state having been changed.

11. The image transmission apparatus of claim 9, wherein the destination selection section receives the destination selection for a broadcast transmission.

12. The image transmission apparatus of claim 9, wherein the destination selection section receives the destination selection for a group registration.

13. An image transmission apparatus for transmitting image data to a designated destination, comprising:
- a mode selection section for receiving a transmission mode selection; and
- a destination selection section for receiving a destination selection;
- wherein the mode selection section enables selection of a transmission mode according to the destination selected by the destination selection section;
- wherein the mode selection section, when receiving an operation of the transmission mode selection, determines whether or not to allow the transmission mode selection according to the destination being selected at the time of receiving the operation; and
- wherein, when the transmission mode selection is not allowed, the mode selection section gives a warning to a user indicating that the selection is not allowed.

14. The image transmission apparatus of claim 13, wherein the mode selection section puts a transmission mode, which is not enabled to be selected, in a non-displaying state on a transmission mode selection screen.

15. An image transmission apparatus for transmitting image data to a designated destination, comprising:
- a mode selection section for receiving a transmission mode selection; and
- a destination selection section for receiving a destination selection;
- wherein the mode selection section enables selection of a transmission mode according to the destination selected by the destination selection section;
- wherein the mode selection section, when receiving an operation of the transmission mode selection, determines whether or not to allow the transmission mode selection according to the destination being selected at the time of receiving the operation; and
- wherein, when the transmission mode selection is not allowed, the mode selection section notifies a user of at least one of a reason why the transmission mode selection is not allowed, and a destination causing non-allowance.

16. An image transmission apparatus for transmitting image data to a designated destination, comprising:
- a mode selection section for receiving a transmission mode selection;
- a destination selection section for receiving a destination selection, wherein the mode selection section enables selection of a transmission mode according to the destination selected by the destination selection section; and
- a registration section for receiving a destination registration, wherein the registration section registers a destination correlating with information about whether the destination corresponds to a color transmission mode or to a monochrome transmission mode;
- wherein the registration section registers an ON operation or an OFF operation for a network facsimile transmission with regard to each destination; and
- wherein the registration section automatically registers the ON operation for a network facsimile transmission with regard to the destination, when the destination, in the course of registration, is selected to correspond to the color transmission mode.

17. An image transmission apparatus for transmitting image data to a designated destination, comprising:
- a mode selection section for receiving a transmission mode selection;
- a destination selection section for receiving a destination selection, wherein the mode selection section enables selection of a transmission mode according to the destination selected by the destination selection section; and
- a registration section for receiving a destination registration, wherein the registration section registers a destination correlating with information about whether the destination corresponds to a color transmission mode or to a monochrome transmission mode;
- wherein the registration section registers an ON operation or an OFF operation for a network facsimile transmission with regard to each destination; and
- wherein the registration section makes one of the ON operation and the OFF operation selectable for a network facsimile transmission with regard to the destination, when the destination, in the course of registration, is selected to correspond to the monochrome transmission mode.

18. An image transmission apparatus for transmitting image data to a designated destination, comprising:
- a mode selection section for receiving a transmission mode selection;
- a destination selection section for receiving a destination selection, wherein the mode selection section enables selection of a transmission mode according to the destination selected by the destination selection section; and
- a registration section for receiving a destination registration, wherein the registration section registers a destination correlating with information about whether the destination corresponds to a color transmission mode or to a monochrome transmission mode;
- wherein the registration section disables a selection of the color transmission mode with regard to the destination, when dial information special to G3 facsimile is inputted regarding the destination in the course of registration.

* * * * *